United States Patent
Jones et al.

(10) Patent No.: US 10,422,459 B2
(45) Date of Patent: Sep. 24, 2019

(54) CONDUIT CONNECTOR WITH A PRIMARY AND SECONDARY LATCH

(71) Applicant: Norma U.S. Holding LLC, Auburn Hills, MI (US)

(72) Inventors: Carl Jones, Kimball, MI (US); Nicholas Ward, Ft. Gratiot, MI (US); Douglas Fansler, Saint Clair, MI (US); Brian Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 816 days.

(21) Appl. No.: 14/992,386

(22) Filed: Jan. 11, 2016

(65) Prior Publication Data

US 2016/0201835 A1   Jul. 14, 2016

Related U.S. Application Data

(60) Provisional application No. 62/103,117, filed on Jan. 14, 2015.

(51) Int. Cl.
| | |
|---|---|
| *F16L 37/12* | (2006.01) |
| *F16L 37/084* | (2006.01) |
| *F16L 37/14* | (2006.01) |

(52) U.S. Cl.
CPC ........... *F16L 37/12* (2013.01); *F16L 37/0841* (2013.01); *F16L 37/144* (2013.01); *F16L 2201/10* (2013.01)

(58) Field of Classification Search
CPC ..... F16L 37/12; F16L 37/0841; F16L 37/144; F16L 2201/10; F16L 37/142; F16L 37/148
See application file for complete search history.

(56) References Cited

U.S. PATENT DOCUMENTS

| | | |
|---|---|---|
| 4,869,534 A | 9/1989 | Ketcham et al. |
| 5,401,063 A | 3/1995 | Plosz |
| 5,586,792 A | 12/1996 | Kalahasthy et al. |

(Continued)

FOREIGN PATENT DOCUMENTS

| | | | |
|---|---|---|---|
| DE | 102006047267 A1 * | 4/2008 | ............ F16L 37/144 |
| DE | 10 2009 036 526 | 2/2010 | |

(Continued)

OTHER PUBLICATIONS

Russian Search Report (with English translation) dated Jun. 6, 2019 in corresponding Russian Application No. 2016100912.

*Primary Examiner* — David Bochna
*Assistant Examiner* — James A Linford
(74) *Attorney, Agent, or Firm* — Harness, Dickey & Pierce, P.L.C.

(57) ABSTRACT

A conduit connector has a housing with primary and secondary latch retainers. The primary latch includes a base, a biasing member and a conduit receiving member. The conduit receiving member includes a pair of arms defining an elliptical opening with a gap between distal ends of the arms. The secondary latch retainer including a base, a verification mechanism and a retaining member. The verification mechanism includes a pair of legs and a slide member. In a locked position an enlarged annulus, of a conduit entering the housing, expands the legs enabling the retaining member to enter the housing toward the axis. A portion of the slide member projects beyond the housing indicating a locked position.

22 Claims, 6 Drawing Sheets

(56) References Cited

U.S. PATENT DOCUMENTS

| | | |
|---|---|---|
| 5,628,531 A | 5/1997 | Rosenberg et al. |
| 5,649,724 A | 7/1997 | Wiethorn |
| 5,683,117 A | 11/1997 | Corbett et al. |
| 5,730,481 A | 3/1998 | Szabo et al. |
| 5,782,502 A | 7/1998 | Lewis |
| 5,863,077 A | 1/1999 | Szabo et al. |
| 5,964,484 A | 10/1999 | Bartholomew |
| 6,062,607 A | 5/2000 | Bartholomew |
| 6,155,612 A | 12/2000 | Szabo |
| 6,231,089 B1 | 5/2001 | DeCler et al. |
| 6,293,596 B1 | 9/2001 | Kinder |
| 6,328,344 B1 | 12/2001 | Tozaki et al. |
| 6,520,546 B2 | 2/2003 | Szabo |
| 6,536,807 B1 | 3/2003 | Raymond et al. |
| 6,540,263 B1 | 4/2003 | Sausner |
| 6,634,679 B1 | 10/2003 | Stieler |
| 6,637,779 B2 | 10/2003 | Andre |
| 6,722,703 B2 | 4/2004 | Takayanagi |
| 6,755,675 B2 | 6/2004 | Szabo et al. |
| 6,802,491 B1 | 10/2004 | Kelly et al. |
| 6,805,383 B2 | 10/2004 | Ostrander et al. |
| 6,832,785 B1 | 12/2004 | Zitkovic, Jr. |
| 6,846,021 B2 | 1/2005 | Rohde et al. |
| 6,863,314 B2 | 3/2005 | Guest |
| 6,866,303 B2 | 3/2005 | Szabo et al. |
| 6,869,110 B2 | 3/2005 | Okada et al. |
| 6,897,374 B2 | 5/2005 | Garber et al. |
| 6,905,143 B2 | 6/2005 | Klinger et al. |
| 7,014,220 B2 | 3/2006 | Szabo et al. |
| 7,044,505 B2 | 5/2006 | Takayanagi |
| 7,055,869 B2 | 6/2006 | Malone |
| 7,121,592 B2 | 10/2006 | Sazbo et al. |
| 7,128,347 B2 | 10/2006 | Kerin |
| 7,314,209 B2 | 1/2008 | Pierson |
| 7,316,425 B2 | 1/2008 | Poder |
| 7,328,922 B2 | 2/2008 | Takayanagi et al. |
| 7,390,025 B2 | 6/2008 | Pepe et al. |
| 7,390,029 B2 | 6/2008 | Matsubara |
| 7,401,818 B2 | 7/2008 | Takayanagi |
| 7,445,249 B2 | 11/2008 | Feger et al. |
| 7,484,774 B2 | 3/2009 | Kerin et al. |
| 7,497,477 B2 | 3/2009 | Pepe |
| 7,497,480 B2 | 3/2009 | Kerin et al. |
| 7,530,605 B2 | 5/2009 | Rigollet et al. |
| 7,537,247 B2 | 5/2009 | Trede et al. |
| 7,566,077 B2 | 7/2009 | Tsurumi |
| 7,651,138 B2 | 1/2010 | Feger et al. |
| 7,677,608 B2 | 3/2010 | Takayanagi |
| 7,731,245 B2 | 6/2010 | Kerin et al. |
| 7,802,822 B2 | 9/2010 | Poder et al. |
| 7,823,930 B2 | 11/2010 | Feger et al. |
| 7,845,684 B2 | 12/2010 | Gaudin |
| 7,866,711 B2 | 1/2011 | Kerin et al. |
| 7,967,342 B2 | 6/2011 | Gunderson |
| 8,033,575 B2 | 10/2011 | Tsurumi |
| 8,113,547 B2 | 2/2012 | Andre |
| 8,113,549 B2 | 2/2012 | Bokühn et al. |
| 8,240,716 B2 | 8/2012 | Kerin et al. |
| 8,282,139 B2 | 10/2012 | Kerin et al. |
| 8,297,659 B2 | 10/2012 | Callahan et al. |
| 8,336,919 B2 | 12/2012 | Gillet et al. |
| 8,408,604 B2 | 4/2013 | Yamada et al. |
| 8,764,068 B2 | 7/2014 | Frick et al. |
| 2003/0067162 A1 | 4/2003 | Welsh et al. |
| 2003/0092324 A1 | 5/2003 | Walker et al. |
| 2005/0179257 A1 | 8/2005 | Dick et al. |
| 2006/0082144 A1 | 4/2006 | Okada |
| 2006/0082145 A1 | 4/2006 | Steveley |
| 2006/0157978 A1 | 7/2006 | Szabo et al. |
| 2007/0138790 A1 | 6/2007 | Feger et al. |
| 2007/0241560 A1 | 10/2007 | Malone |
| 2008/0012313 A1 | 1/2008 | Reinholtz |
| 2008/0231045 A1 | 9/2008 | Trede et al. |
| 2008/0279621 A1 | 11/2008 | Chaupin |
| 2008/0315576 A1 | 12/2008 | Moretti et al. |
| 2010/0019487 A1 | 1/2010 | deCler et al. |
| 2010/0052313 A1 | 3/2010 | Ishida et al. |
| 2010/0052315 A1 | 3/2010 | Kerin et al. |
| 2011/0174838 A1 | 7/2011 | Schroeder |
| 2011/0204621 A1 | 8/2011 | Whitaker et al. |
| 2012/0086197 A1 | 4/2012 | Bauer et al. |
| 2012/0153615 A1 | 6/2012 | Rehder et al. |
| 2012/0242080 A1 | 9/2012 | Nezu |
| 2013/0140808 A1 | 6/2013 | Bongiorni et al. |
| 2013/0307263 A1 | 11/2013 | Parks et al. |
| 2014/0001752 A1 | 1/2014 | Parks et al. |
| 2014/0103644 A1 | 4/2014 | Rehder et al. |

FOREIGN PATENT DOCUMENTS

| | | |
|---|---|---|
| EP | 1 582 800 | 10/2005 |
| EP | 2 251 581 | 11/2010 |
| RU | 2084747 C1 | 7/1997 |
| RU | 2169865 C2 | 6/2001 |
| RU | 80212 U1 | 1/2009 |
| RU | 135066 U1 | 11/2013 |
| WO | WO-2015-036757 A1 | 3/2015 |

* cited by examiner

CONDUIT CONNECTOR WITH A PRIMARY AND SECONDARY LATCH

CROSS-REFERENCE TO RELATED APPLICATION

This application claims the benefit of U.S. Provisional Application No. 62/103,117, filed on Jan. 14, 2015. The entire disclosure of the above application is incorporated herein by reference.

FIELD

The present disclosure relates to quick connectors and, more particularly, to a quick conduit connector with a primary and secondary latch retainer.

BACKGROUND

Quick connectors or snap connectors are utilized in a wide range of applications, particularly to join fluid carrying conduits in automotive and industrial applications. Typically, a retainer is mounted in a housing of the female portion of the connector. A male spigot is inserted into the housing and latched by a retainer. In order to enhance retention of the male spigot, a secondary retainer is provided. Further, various types of seals and seal retainers are positioned inside of the female housing to seal the male spigot against leakage.

Various types of quick connectors exist with primary and secondary retaining latches. While these quick connectors provide satisfactory connections, those skilled in the art are always striving to improve. Additionally, these quick connectors provide an indicator to provide the user with a visual indication that positive latching has occurred. These indicators generally project from the housing to provide the user with the assurance that the first and secondary latches have been properly locked to secure the male and female parts of the connector together.

The present disclosure provides the art with a quick connector having a primary and secondary latch retainer with a visual indicator. The visual indicator reveals that the male conduit is securely locked within the female housing. The present disclosure provides a primary and secondary latch retainer that mesh with one another to surround an upset on the male spigot portion of the connection. Additionally, the present disclosure provides a visual indicator on the second latch retainer that is adjacent a push button release of the first latch retainer. This enables release of the male spigot from the female housing by pressing the visual indicator and the push button release from substantially the same position without the need for the user to move his hand.

SUMMARY

According to the disclosure, a quick conduit connector comprises a housing having a latch retainer receiving end and a spigot. A central bore, defining an axis, extends through the housing. A primary latch retainer is positioned in the latch retainer receiving end of the housing. The primary latch retainer includes a push button base, a biasing member and a conduit receiving member. The conduit receiving member includes a pair of arms extending from the base. The pair of arms defines an elliptical opening with a gap between distal ends of the arms. The biasing member secures the primary latch retainer with the latch retainer receiving end of the housing. A secondary latch retainer is positioned in the conduit receiving end of the housing. The secondary latch retainer includes a base, a verification mechanism and the retaining member. The verification mechanism extends from the base and includes a pair of legs and a slide member. The slide member includes an opening to enable passage of a male conduit into the conduit receiving end of the housing. In an unlocked position, the pair of legs is blocked by the housing prohibiting entry of the retaining member toward the central bore axis. In a locked position, an enlarged annulus of the conduit entering the housing expands the legs to enable the second latch retaining member to enter the housing towards the axis. A portion of the slide member projects beyond the housing to indicate a locked position. The second latch retaining member inserts into the gap between the arms of the first latch retainer in the locked position. The first latch retainer arms move transverse to the bore axis to enable the spigot of the male conduit to lock with the first latch retainer. The second latch retainer slide member is positioned in a channel in the housing. A tapered surface is on the first retainer arms. The first latch retainer base acts as a push button to release the male conduit spigot from the locked position. The first latch retainer biasing member is guided in a channel in the housing. The channel includes a tapered surface that, upon contact, biases the biasing member. When the force is removed from the first latch base, the tapered surfaces return the first latch retainer to its original position. The portion of the slide member extending from the housing is forced towards the housing to unlock the second latch retainer. The first latch retainer push button base and second latch retainer portion of the slide member extend from the housing adjacent one another.

According to a second object of the invention, a quick conduit connector comprises a housing with a latch retainer receiving end and a spigot. A central bore, defining an axis, extends through the housing. A primary latch retainer is positioned in the latch retainer receiving end of the housing. The primary latch retainer includes a push button base, a biasing member and a conduit receiving member. The conduit receiving member includes a pair of arms extending from the base. The pair of arms defines an elliptical opening with a gap between distal ends of the arms. The biasing member secures the primary latch retainer within the latch retainer receiving end of the housing. A secondary latch retainer includes a base, a verification mechanism and a retaining member. The verification mechanism extends from the base and includes a visual indicator. In an unlocked position, the visual indicator is positioned in the housing. In the locked position, the visual indicator extends from the housing. The visual indicator is adjacent the first latch retainer push button base. Thus, to release the male conduit connector from the housing, a force is applied to the visual indicator and to the push button in the same direction. The visual indicator and push button are aligned next to one another in the unlocked position. The visual indicator and push button are on the same side of the housing. The visual indicator abuts the push button. Upon the user returning the visual indicator to the unlocked position, the user can immediately press the push button to release the conduit spigot. This enables release of the male conduit from the housing without the user repositioning his hand. The housing latch retainer receiving end includes a pair of opposing walls separated by the central bore. An opening is between an end of the pair of opposing walls. The visual indicator and push button are positioned in the opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
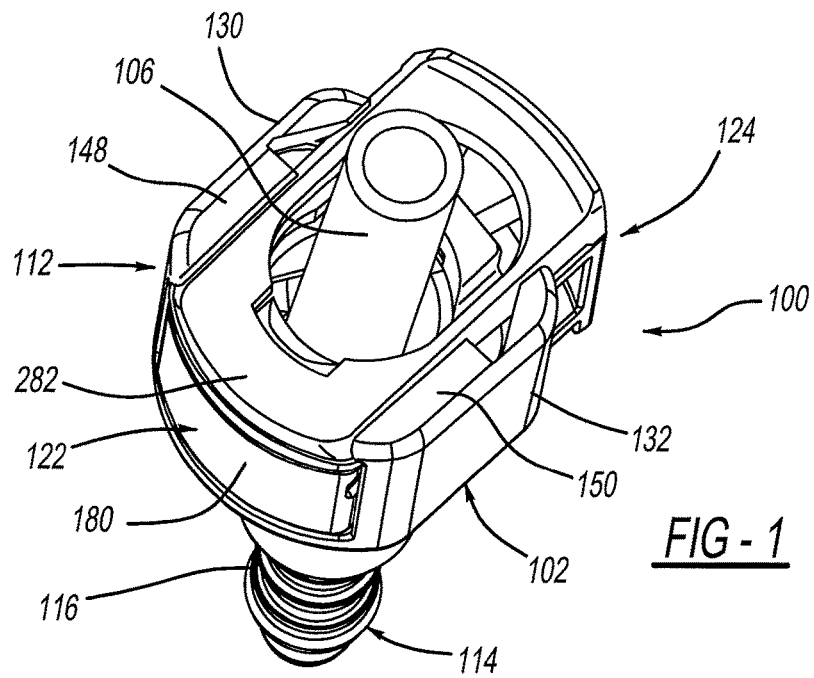
FIG. 1 is a perspective view of the quick conduit connector in accordance with the disclosure.
Figure 2:
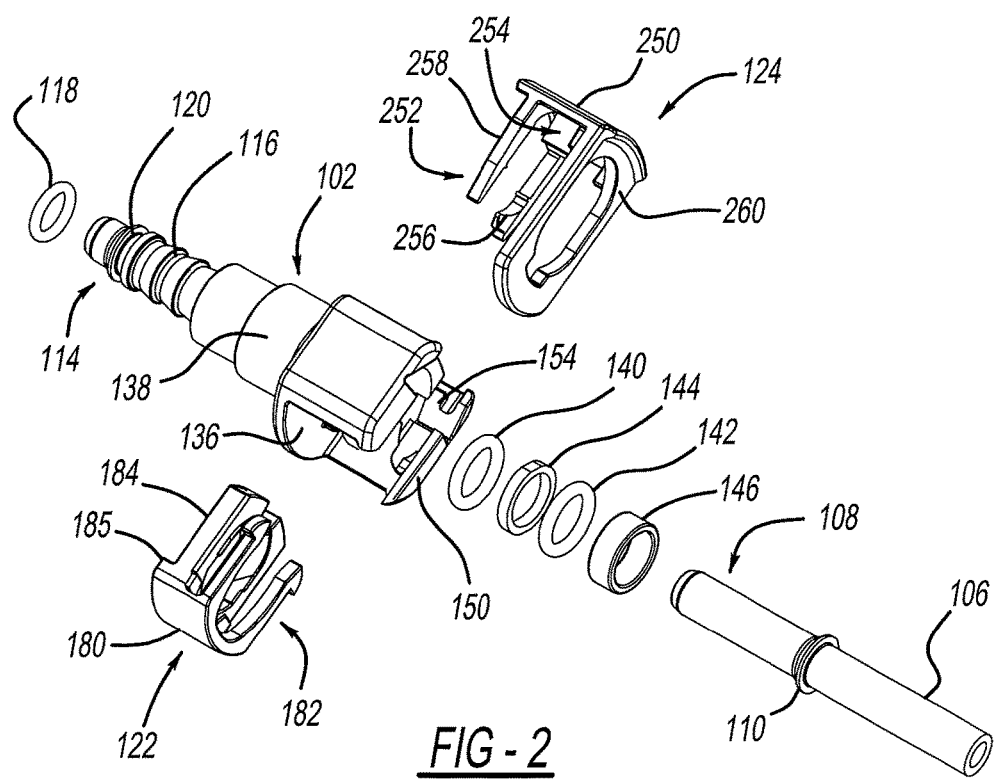
FIG. 2 is an exploded view of FIG. 1.
Figure 3:
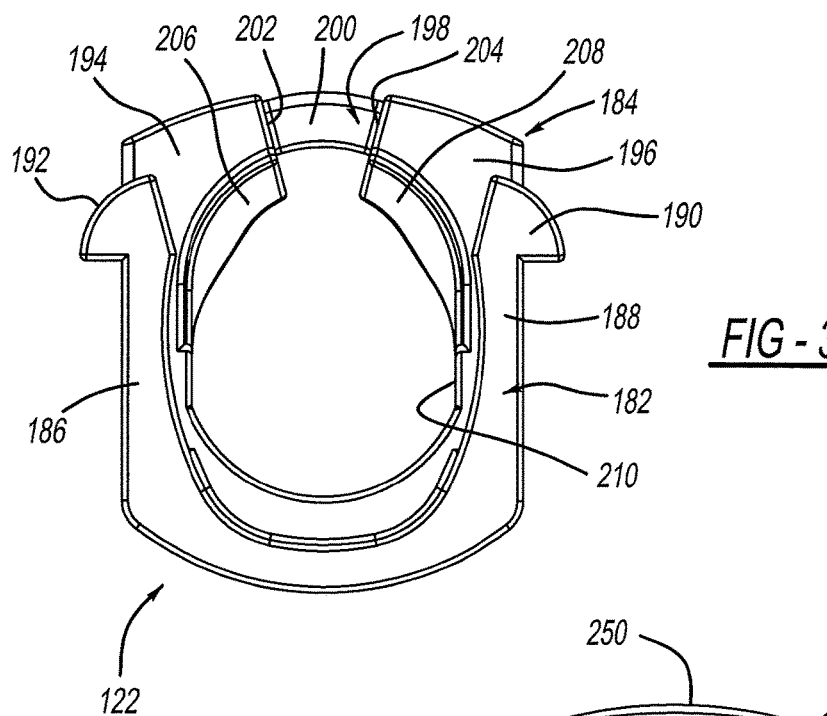
FIG. 3 is a front elevation view of the first latch retainer.
Figure 4:
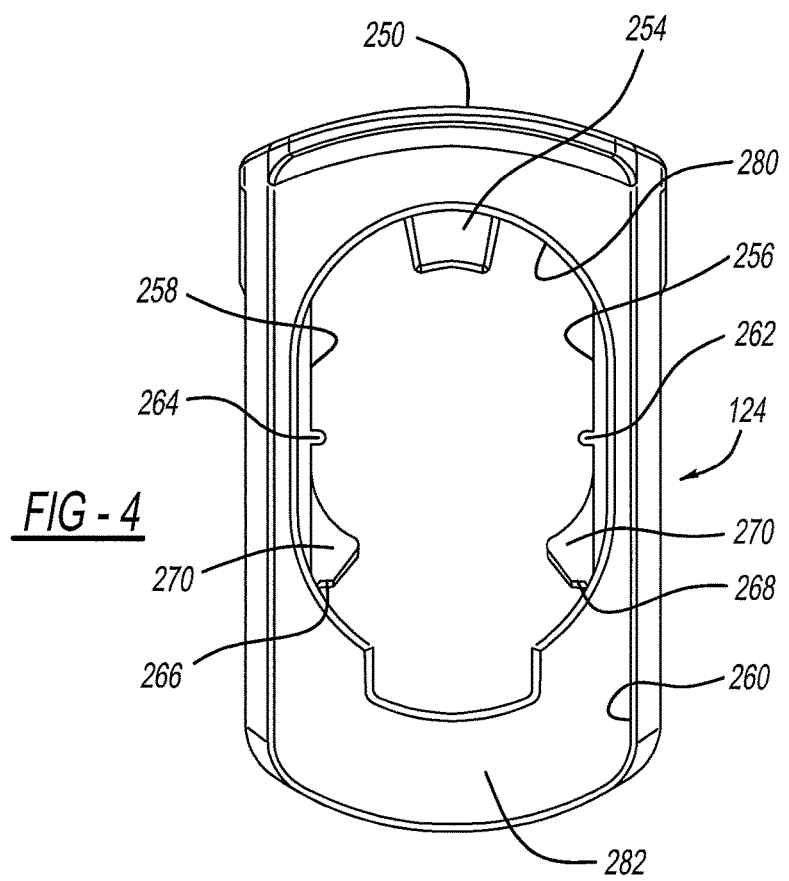
FIG. 4 is a rear elevation view of the second latch retainer.
Figure 5:
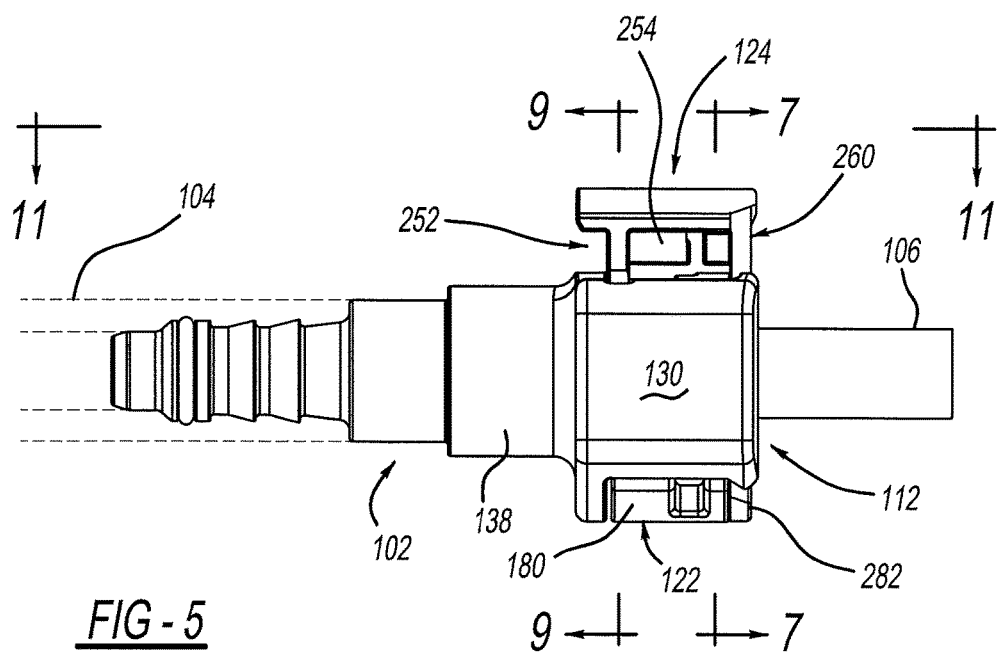
FIG. 5 is a side elevation view of the quick conduit connector in an unlocked positioned.
Figure 6:
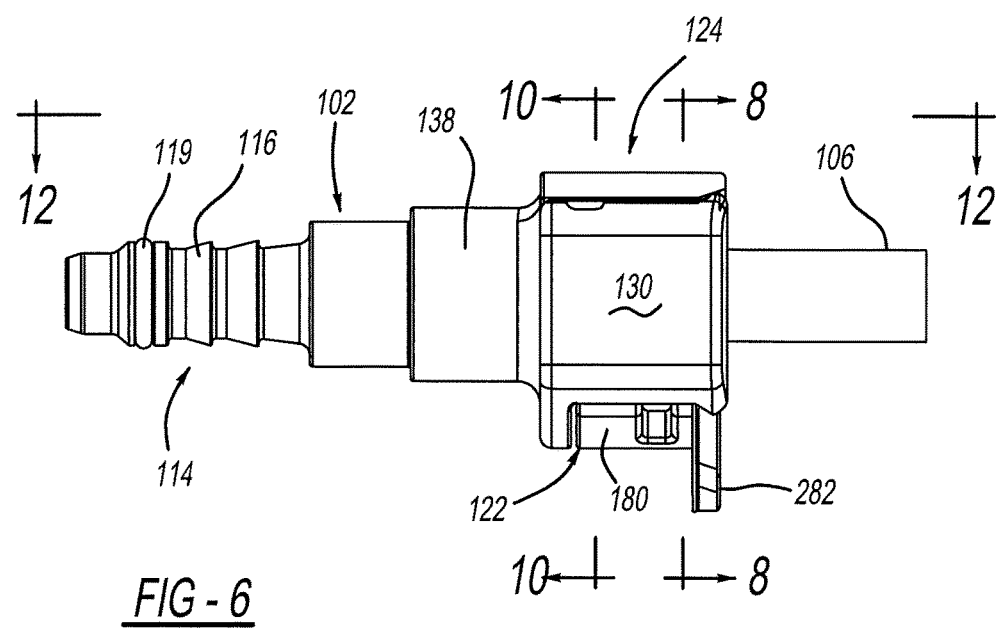
FIG. 6 is a view like FIG. 5 in the locked position.

Example embodiments will now be described more fully with reference to the accompanying drawings.

Turning to the figures, a quick conduit connector assembly is illustrated and designated with the reference numeral 100. The assembly includes a housing 102 connected with conduit 104 and a male conduit 106. The male conduit 106 includes a spigot end 108 and an upset 110. The housing 102 includes a latch retainer receiving end 112 and a spigot 114 that is coupled with conduit 104. The spigot 114 generally includes a plurality of annular ridges or barbs 116 to assist in coupling with the conduit 104. Also, a seal 118 may be positioned on the spigot 114 in an annular recess 120 to enhance sealing between the spigot and the conduit 104. A hose clamp (not shown) may be positioned over the conduit 104 and spigot 114 to secure the two together.

The latch retainer receiving end 112 houses a primary latch retainer 122 and the secondary latch retainer 124. The housing 102 including the latch retainer receiving ends 112 and spigot 114 defines a central through bore 126. The central through bore 126 extends through the housing 102 and defines a longitudinal axis 128. The latch retainer receiving end 112 includes a pair of opposing walls 130, 132. A partition 134 extends between the walls 130, 132. The partition 134 includes an opening aligned along the central bore 126. The opposing walls 130, 132 include a back wall 136 that acts as a web to connect the opposing walls 130, 132 with one another and spigot 114. The back wall 136 also defines an opening to enable the spigot 108 to pass through the back wall 136. An enlarged cylindrical portion 138 is connected with the back wall 136 leading into the spigot 114. The cylindrical portion 138 houses the seals 140, 142, spacer 144 and top hat 146. These elements seal the male spigot 108 within the housing 102.

The free ends of the walls 130, 132 include inwardly angled tapered flanges 148, 150. Channels 152, 154 are formed between the flanges 148, 150 and the partition 134. The channels 152, 154 receive the primary and secondary latch retainers 122, 124 as will be explained herein. Openings 156, 158 are formed between the opposing walls 130, 132 on opposite ends of the walls. Thus, the openings 156, 158 oppose one another.

The channels 152, 154 include tapered walls 160, 162. The back wall 136 includes detents 164, 166, 168, 170. The detents 164, 166, 168, 170 include a curved surface 172 and a wedge 174. A second channel 176 is formed between the partition 134 and rear wall 136.

Figure 7:
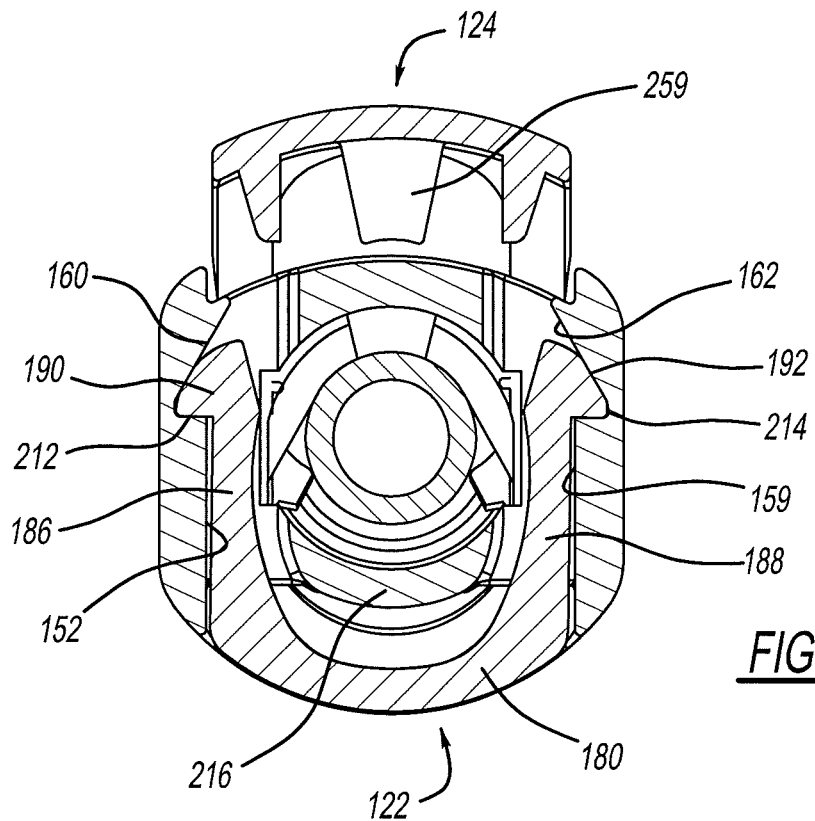
FIG. 7 is a cross-section view of FIG. 5 along line 7-7.

The first or primary latch retainer 122 includes a push button base 180 connected with a biasing member 182 and a conduit receiving member 184. The biasing member 182 extends from one end of the push button base 180. The biasing member 182 has an overall horseshoe shape. It includes a pair of legs 186, 188 with barbs 190 at the free ends of the legs 186, 188. The barbs 190 include an outer curved surface 192 that contacts curved tapered surfaces 160, 162. The curved surfaces 192 ride along the curved tapered surface 160, 162 as illustrated in FIG. 7.

The conduit receiving member 184 includes a pair of arms 194, 196 extending from the other end of the push button base 180. The arms include a gap 198 at their free distal end. The arms 194, 196 are connected at their distal end by a backing plate 200. The gap 198 is defined by the backing plate 200 and the arm surfaces 202, 204. Thus, an open channel is formed between the arms 194, 196.

The arms 194, 196 include tapered surfaces 206, 208. The tapered surfaces 206, 208 urge the male spigot 108 into the housing 102. The arms 194, 196 define an elliptical opening 210 that enables passage of the male spigot 108. A spacer portion 185 is adjacent the back wall 136. As the male spigot 108 enters into the conduit receiving member 184, the tapered surfaces 206, 208 contact the enlarged annular upset 110. This moves the first retaining latch 122, push button 180, in a first direction toward the axis 128 and one of the end openings of the walls 130, 132. As this occurs, biasing occurs between the barbs 190, as the biasing member 182 moves against the curved tapered surfaces 160, 162. After the upset 110 passes the conduit receiving member 184, the first retaining latch 122 moves in an opposite direction away from the axis 128. This is due to the force of the tapered surfaces 160, 162 forcing the spring legs 186, 188 in the opposite direction. Also, the barbs 190, due to the ledge 212, 214, formed in the channel 152, 154, retain the first latch retainer 122 in the latch retainer end 112. The first latch retainer conduit receiving member 184 is positioned in the second channel between the partition 134 and back wall 136. Also, the partition 134 includes a tapered surface 216 adjacent the opening that enhances insertion of the upset 110 and spigot 108 into the housing 102 and through the first latch retainer 122.

Figure 8:
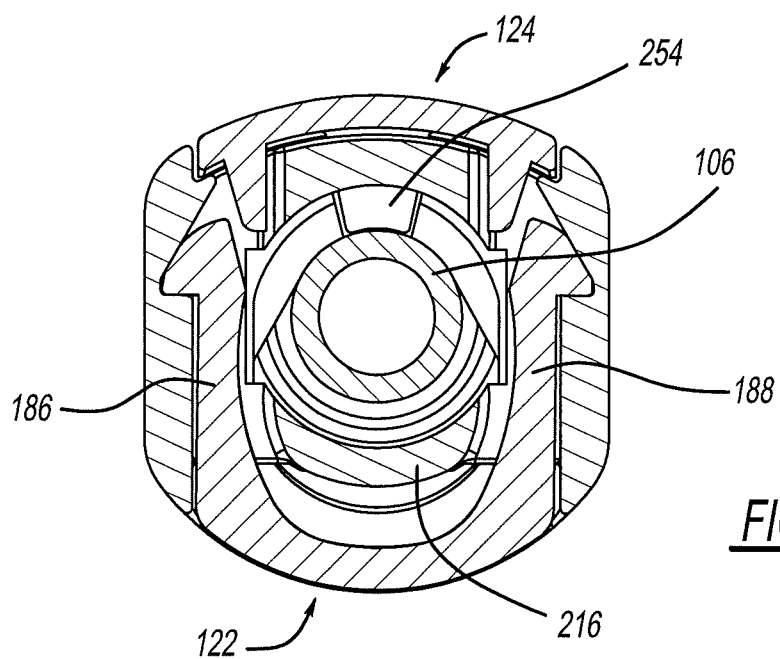
FIG. 8 is a cross-section view of FIG. 6 along line 8-8 thereof.
Figure 9:
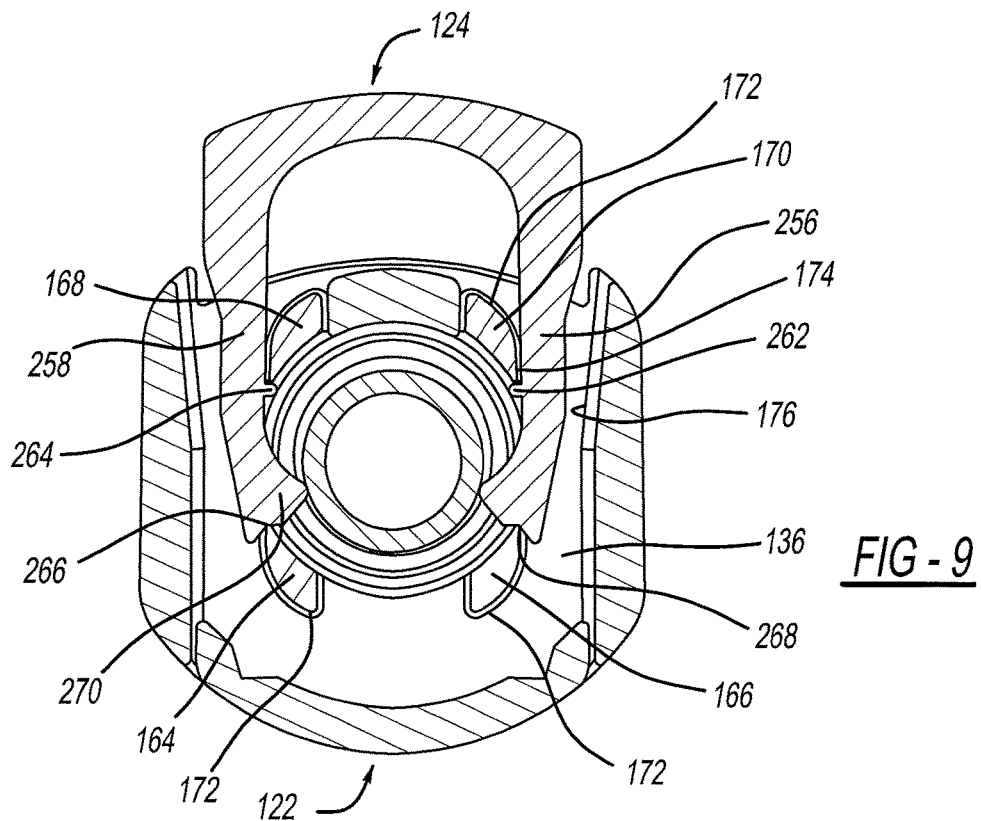
FIG. 9 is a cross-section view of FIG. 5 along line 9-9 thereof.
Figure 10:
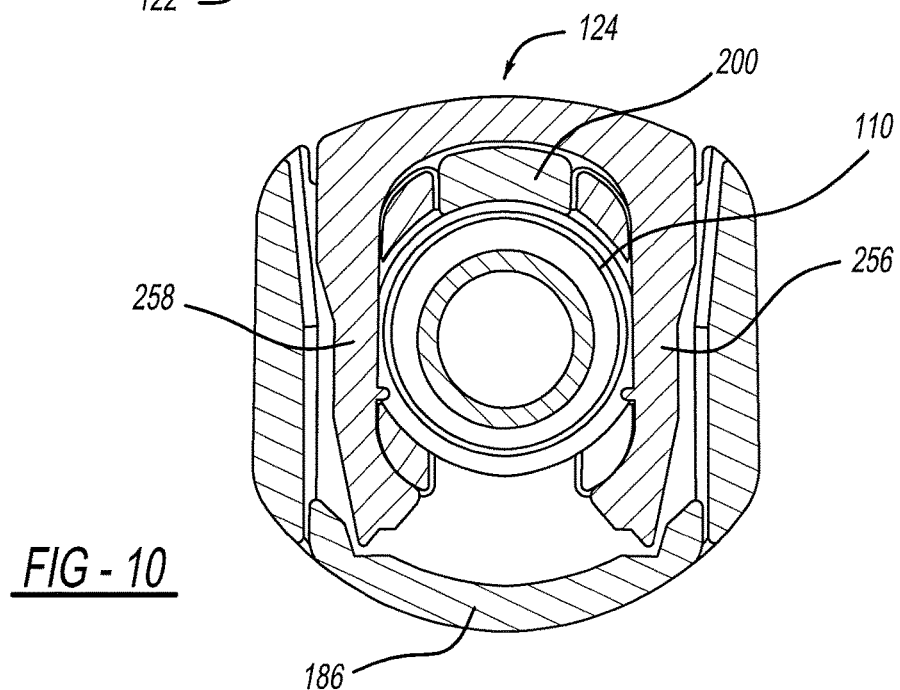
FIG. 10 is a cross-section view of FIG. 6 along line 10-10 thereof.
Figures 11, 12:
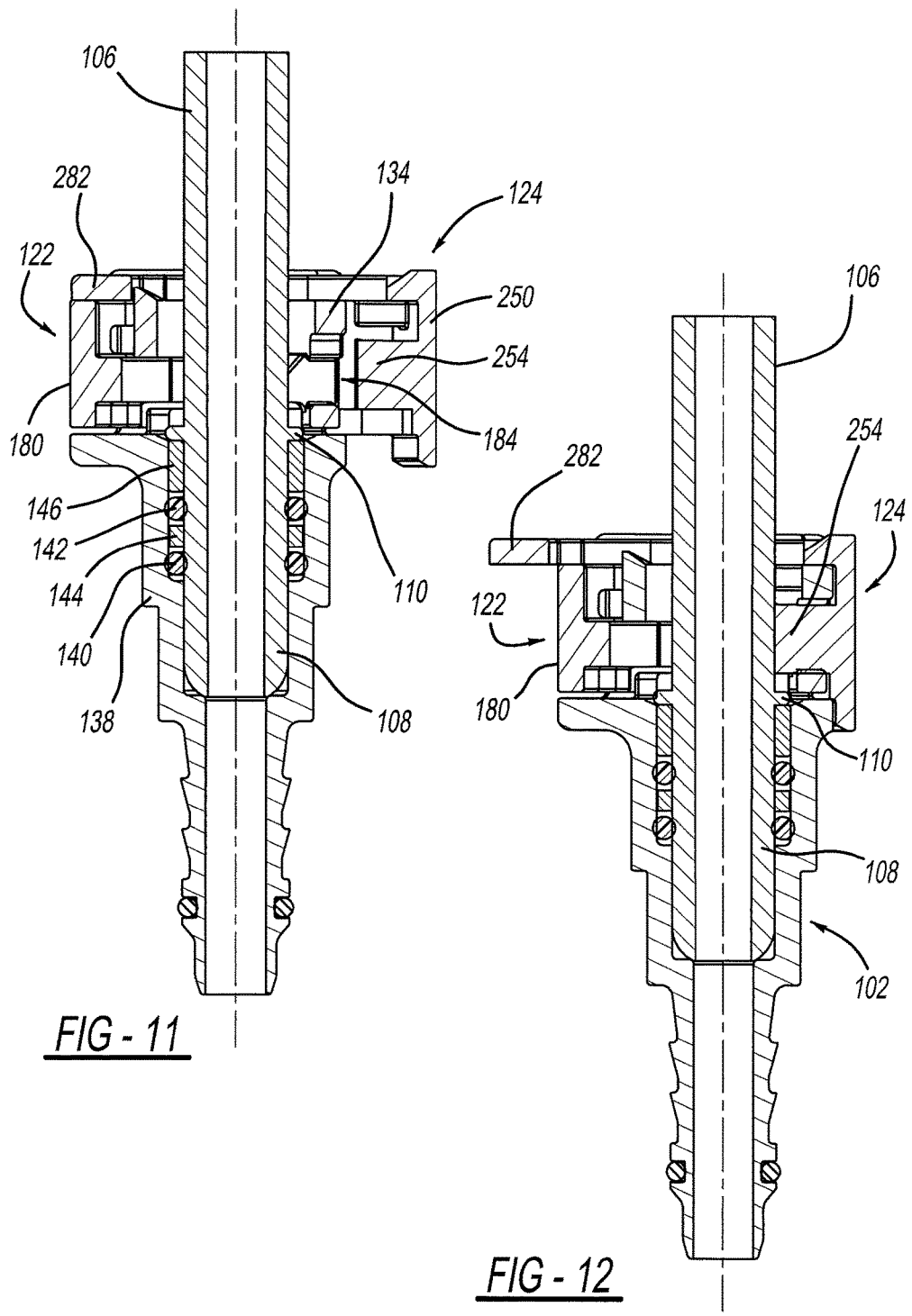
FIG. 11 is a cross-section view of FIG. 5 along line 11-11 thereof.
FIG. 12 is a cross-section view of FIG. 6 along line 12-12 thereof.

The second or secondary latch retainer 124 includes a base 250, a verification mechanism 252 and a retaining member 254. The base 250 has an outer arcuate surface that is curved to provide a continuous appearance with the outer surface of the housing in the locked position. The verification mechanism 252 includes a pair of legs 256, 258 and a slide member 260. The legs include detents 262, 264, 266, 268. These detents mesh with detents 164, 166, 168 and 170 to maintain the secondary latch retainer in an unlocked position as illustrated in FIG. 8. Also, the free ends of the legs include tapered surfaces 270 that enhance the entrance of the upset 110 of spigot 108 into a retained position as illustrated in FIG. 9.

The slide member 260 has an elliptical opening 280 and a visual indicator 282. The elliptical opening 280 enables passage of the spigot 108 through the slide 260. The slide 260 fits in the channels 152, 154 at the latch retainer receiving end 112 of the housing 102. The legs 256, 258 fit in the second channel between the back wall 136, the conduit receiving member 184 and spacer portion 185 of the first retainer latch 122.

The connector assembly is illustrated in FIG. 1 in the unlatched position. In order to latch the conduit 106 with the housing 102, the following occurs. The conduit 106 with spigot 108 enters into the slide member aperture 280. The conduit spigot 108 continues through the partition aperture past the biasing member 182 toward the first retaining latch retaining member 184. The upset 110 contact the tapered surface on the partition 134 to center it along the axis. The upset 110 continues into the housing 102 toward the spigot 114 and contacts the first latch retaining member 184. As this occurs, the tapered surfaces 206, 208 on the retaining member 184 contact the upset 110. The conduit 106 is continued to be pushed into the housing 102. The retaining member 184 moves in a first direction away from the axis 128. Due to the backing plate 200 securing the arms 194, 196 together, no lateral movement of the arms 194, 186 occurs. This enables a transverse movement of the first latching retainer 122 away from the axis 128. The upset 110 passes the retaining member 184 and moves into the area defined by the spacer portion 185 of the first retainer 122 between the retaining member 184 and the back wall 136. As this occurs, the upset 110 contact the legs 256, 258 of the second latch retainer 122. The tapered surfaces 270 enable the legs 256, 258 to move away from one another. As this occurs, the detents 262, 264, 266, 268 move out of contacts with the detents 164, 166, 168 and 170. Thus, the arms 256, 258 are positioned along the circumferential surface of the upset 110. The second latch retainer 124 can now move toward the axis 128 of the housing 102. As this occurs, the retaining member 254 is positioned into the gap 200 between the surfaces 202, 204 of the extending ends of the arms 182, 184. The second latch retainer member 254, as well as the first latch retainer member 184, is positioned adjacent the smaller diameter portion of conduit 106 blocking the upset 110 from exiting housing 102. Also, as this occurs, the visual indicator 182 projects beyond the surface of the latch retainer receiving end 112. Thus, the user can easily see that the first 122 and second 124 latch retainers are in a locked position.

In order to release the conduit 106 from the housing 102, a force is applied on the visual indicator 282 transverse to the axis 128. The visual indicator 282, immediately adjacent the push button base 180, moves toward the axis 128 of the housing 102. Once the end of the visual indicator 182 is flush with the push button base 180 and continuous in appearance with the housing walls 130, 132, the push button base 180 can be moved towards the axis 128 of the housing 102. This moves the elliptical opening towards alignment with the axis 128. This enables the conduit 106 to be withdrawn from the housing since the opening in the retainer 184 is large enough to enable the upset 110 to be removed through the elliptical opening from the first latch retainer 122. Also, as this occurs, the biasing member 182 and barbs 190 contact the tapered arcuate surfaces 156, 158. The tapered surfaces force the biasing member as well as the first latch retainer 122 back to its original position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conduit connector comprising:
a housing, the housing has a latch retainer receiving end and a spigot, a central passage bore, defining an axis, extends through the housing;
a primary latch retainer positioned in the latch retainer receiving end of the housing, the primary latch including a base, a biasing member and a conduit receiving member, the conduit receiving member including a pair of arms extending from the base and defining an elliptical opening with a gap between distal ends of the arms, the biasing member secures the primary latch retainer with the latch retainer receiving end of the housing;
a secondary latch retainer positioned in the latch retainer receiving end of the housing, the secondary latch retainer including a base, a verification mechanism and a retaining member, the verification mechanism extends from the base and includes a pair of legs and a slide mechanism, the slide mechanism includes an opening for passage of a male conduit into the latch retainer receiving end of the housing in an unlocked position, the pair of legs is, in an unlocked condition, blocked by the housing prohibiting entry of the retaining member into the housing toward the axis of the central bore, in a locked position an enlarged annulus of a conduit entering the housing contacts and expands the pair of legs, this enables the retaining member to be moved to enter the housing toward the axis, additionally a portion of the slide member projects beyond the housing indicating a locked position.

2. The conduit connector of claim 1, wherein the retaining member inserts into the gap between the arms of the primary latch retainer in the locked position.

3. The conduit connector of claim 1, wherein the primary latch retainer arms move transverse to the bore axis to enable a conduit to lock with the primary latch retainer.

4. The conduit connector of claim 1, wherein the secondary latch retainer slide member is positioned in a channel in the housing.

5. The conduit connector of claim 1, further comprising a tapered surface on the primary retainer arms.

6. The conduit connector of claim 1, wherein the primary latch retainer base acts as a push button to release the conduit from a locked position.

7. The conduit connector of claim 1, wherein the primary latch retainer biasing member is guided in a channel in the housing.

8. The conduit connector of claim 7, wherein the channel includes a tapered surface that, upon contact, biases the biasing member, when a force is placed on the base, and returns the primary latch retainer to its original position upon removal of the force.

9. The conduit connector of claim 1, wherein a portion of the slide member extending from the housing is forced toward the housing to unlock the secondary latch retainer.

10. The conduit connector of claim 1, wherein the primary latch retainer base and secondary latch retainer portion of the slide member extending from the housing are adjacent one another.

11. A conduit connector comprising:
- a housing, the housing having a latch retainer receiving end and a spigot, a central passage bore, defining an axis, extends through the housing;
- a primary latch retainer positioned in the latch retainer receiving end of the housing, the primary latch including a push button base, a biasing member and a conduit receiving member, the conduit receiving member including a pair of arms extending from the base and defining an elliptical opening with a gap between distal ends of the arms, the biasing member secures the primary latch retainer with the conduit receiving end of the housing;
- a secondary latch retainer including a base, a verification mechanism and a retaining member, the verification mechanism extends from the base and includes a visual indicator, in an unlocked position the visual indicator is positioned in the housing and in the locked position, the visual indicator extends from the housing, the visual indicator is adjacent the push button base of the first latch retainer such that to release the conduit connector from the locked position, a force is applied to both the visual indicator and the push button base in the same direction to release the conduit connector.

12. The conduit connector of claim 11, wherein the visual indicator and the push button are aligned with one another in the unlocked position.

13. The conduit connector of claim 11, wherein the visual indicator and push button are on the same side of the housing.

14. The conduit connector of claim 11, wherein the visual indicator abuts a push button.

15. The conduit connector of claim 11, wherein housing latch retainer receiving end includes a pair of opposed walls separated by the central bore and an opening between an end of the pair of opposed walls wherein the visual indicator and push button are positioned in the opening.

16. A conduit connector comprising:
- a housing, the housing has a latch retainer receiving end and a spigot, a central passage bore, defining an axis, extends through the housing;
- a primary latch retainer positioned in the latch retainer receiving end of the housing, the primary latch including a base, a biasing member and a conduit receiving member, the conduit receiving member including a pair of arms extending from the base and defining an elliptical opening with a gap between distal ends of the arms, the biasing member secures the primary latch retainer with the latch retainer receiving end of the housing;
- a secondary latch retainer positioned in the latch retainer receiving end of the housing, the secondary latch retainer including a base, a verification mechanism and a retaining member, the verification mechanism extends from the base and includes a pair of legs and a slide mechanism, the slide mechanism includes an opening for passage of a male conduit into the latch retainer receiving end of the housing in an unlocked position, the pair of legs is, in an unlocked condition, blocked by the housing prohibiting entry of the retaining member into the housing toward the axis of the central bore, in a locked position an enlarged annulus of a conduit entering the housing contacts and expands the pair of legs, this enables the retaining member to be moved to enter the housing toward the axis, additionally a portion of the slide member indicates a locked position.

17. A conduit connector comprising:
- a housing, the housing having a latch retainer receiving end and a spigot, a central passage bore, defining an axis, extends through the housing;
- a primary latch retainer positioned in the latch retainer receiving end of the housing, the primary latch including a push button base, a biasing member and a conduit receiving member, the conduit receiving member including a pair of arms extending from the base and defining an elliptical opening with a gap between distal ends of the arms, the biasing member secures the primary latch retainer with the conduit receiving end of the housing;
- a secondary latch retainer including a base, a verification mechanism and a retaining member, the verification mechanism extends from the base and includes a visual indicator, in an unlocked position the visual indicator is positioned in the housing and in the locked position, the visual indicator illustrates a locked position; and
- a force is applied to both the verification mechanism and a push button base of the first latch retainer in the same direction to release the conduit connector.

18. The conduit connector of claim 17, wherein the visual indicator and a push button are adjacent with one another in the locked position.

19. The conduit connector of claim 17, wherein the visual indicator projects from a slide.

20. The conduit connector of claim 17, wherein the visual indicator at a latch retainer end of the housing.

21. The conduit connector of claim 17, wherein the visual indicator is adjacent the primary latch retainer.

22. The conduit connector of claim 17, wherein the visual indicator is readily accessible.

* * * * *